Figure 1:
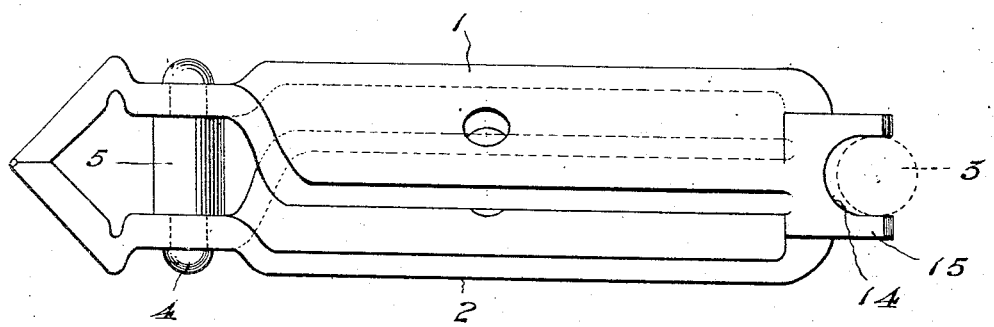

F. J. SCHROEDER.
METHOD OF PRODUCING BRAKE BEAM FULCRUMS.
APPLICATION FILED JULY 30, 1914.

1,161,737.

Patented Nov. 23, 1915.
3 SHEETS—SHEET 1.

Witnesses
Robert M. Sutphen
J. M. Wynkoop

Inventor
Frederick J. Schroeder
By Knight Bros
Attorney

F. J. SCHROEDER.
METHOD OF PRODUCING BRAKE BEAM FULCRUMS.
APPLICATION FILED JULY 30, 1914.

1,161,737.

Patented Nov. 23, 1915.
3 SHEETS—SHEET 2.

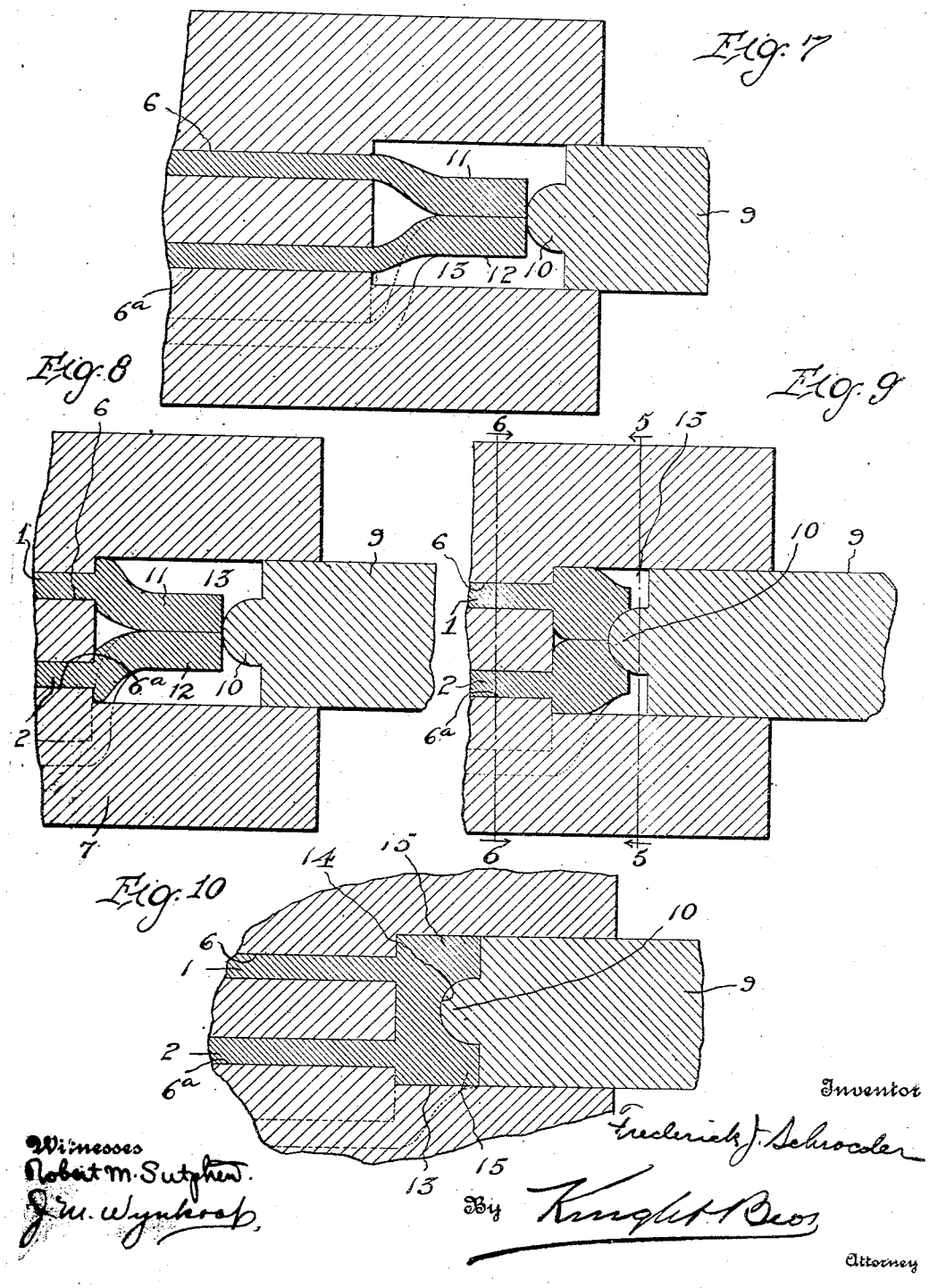

UNITED STATES PATENT OFFICE.

FREDERICK J. SCHROEDER, OF CLEVELAND, OHIO, ASSIGNOR TO THE DAMASCUS BRAKE BEAM CO., OF CLEVELAND, OHIO, A CORPORATION OF OHIO.

METHOD OF PRODUCING BRAKE-BEAM FULCRUMS.

1,161,737. Specification of Letters Patent. Patented Nov. 23, 1915.

Application filed July 30, 1914. Serial No. 854,151.

*To all whom it may concern:*

Be it known that I, FREDERICK J. SCHROEDER, a citizen of the United States of America, residing at Cleveland, in the county of Cuyahoga and State of Ohio, have invented certain new and useful Improvements in Methods of Producing Brake-Beam Fulcrums, of which the following is a specification.

My invention relates to fulcrums for trussed brake beams and particularly to the class of such fulcrums called forged fulcrums, which are made by shaping up a comparatively light bar or bars of rolled steel stock. Such a fulcrum is used by introducing it in position to serve as a strut between the compression and tension members of the brake beam. It is required to have a pair of arms spaced apart to leave a slot between them for the reception of a brake lever and transverse bearings to receive a pin which passes through the arms and the brake lever in pivotally mounting the lever upon the fulcrum. It must also have suitable bearings at its respective ends to receive the compression and tension members. The slot is usually required to be in a plane inclined to the vertical and to the plane of the compression and tension members, which adds somewhat to the complication of shaping up the fulcrum and renders particularly difficult, the provision of the tension member bearing at the outer end, which is required to be in the form of a seat to secure the tension member against transverse displacement under the strenuous conditions of vibration and jarring to which a brake beam is subjected in use.

It has been proposed to form a part of the tension member bearing upon each of the arms and secure the arms together by a bolt or rivet at some point adjacent to the bearing, but this has not been wholly satisfactory because of the liability of the bolt or rivet to break and permit the ends to become separated, which in turn results in destruction of the break beam and failure of the brake; and partly because in modern practice, the length of slot required for swinging of the brake lever takes up so much of the available space between the compression and tension member bearings of the fulcrum as to render very undesirable, if not very difficult, the use of any connecting means near the tension member bearing. Moreover, the plane of the tension member bearing so far approaches the plane of the slot as to develop a considerable tendency to separate the walls of the slot and thus add to the insecurity of the riveted type of tension member bearing.

The object of the present invention is to develop from the rolled steel stock and upon the outer end of a slotted brake beam fulcrum of the forged type, a solid block-like tension member bearing integrally united with the outer ends of the two arms, shaped to provide the reëntrant seat or depression and affording a substantial and solid bridge between them, which, notwithstanding the approach of the plane of the tension member to the plane of the slot, will resist all tendency to split the brake fulcrum and, withal, render permanent and safe what is ordinarily a very vulnerable part of the trussed brake beam structure.

According to the preferred method of procedure, the outer end of the fulcrum is subjected to pressure in the direction of one of its dimensions while being confined in the direction of the other dimension, so that the metal accumulates in a solid block-like body integral with both arms of the fulcrum, assuming a position which adapts it to bridge from one corner to the diagonally opposite corner, and thus deliver a direct thrust upon the two arms of the fulcrum and having the metal gathered in from the other two diagonally opposite corners, so as to provide solid and substantial side walls to the seat of the tension member. The shape of the seat will, of course, depend upon the section of the tension member which it is to receive. In the illustration selected, the seat is adapted for a tension member of round section.

Preferably, this shaping up of the outer end of the fulcrum blank is accomplished in a so-called heading machine, carrying a die which is forced against the end of the fulcrum while said end is confined in a suitable mold, and the metal of the fulcrum in rear of the part to be consumed in the shaping operation being firmly gripped and backed up between clamping dies; the endwise pressure being sufficient to forge the end into a single integral mass, shaped to confine the tension member on the end of the fulcrum, and solid and substantial enough to transmit thrust equally between both arms of the fulcrums and the integral bearing end with which they are thus provided. This method of procedure is not only very effective in results, but is particularly advantageous, in that it insures such results even though the two arms of the fulcrum may originally be separate pieces presented to the heading machine without any preliminary forging together or other means of uniting them.

With these preliminary observations regarding the essential features of the invention, I will proceed to describe in detail, the particular embodiment selected for purposes of illustration.

Figure 2:
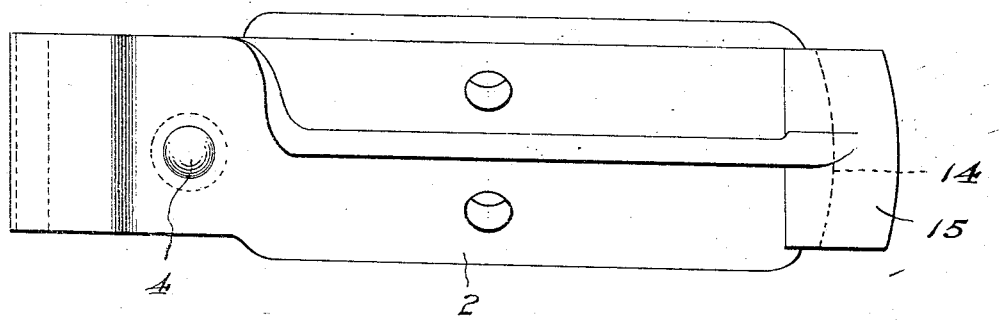
Figure 3:
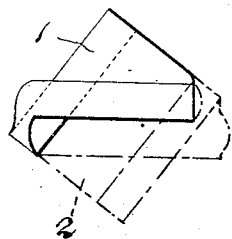
Figure 4:
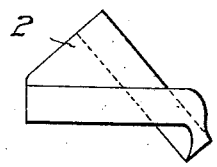
Figure 5:
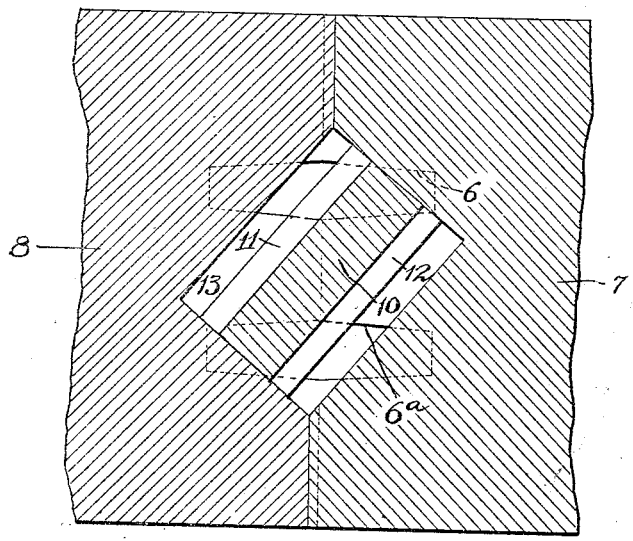
Figure 6:
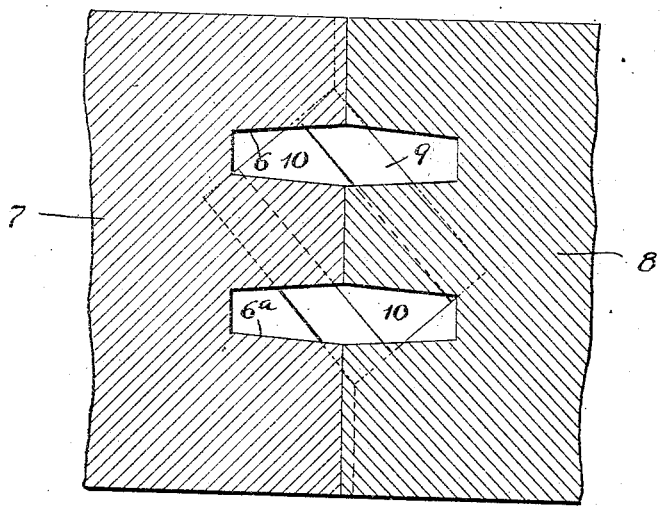

In the drawing:—Figure 1 is a side elevation of a strut or fulcrum embodying my invention; Fig. 2 is a top plan view of the same; Figs. 3 and 4 are detail views showing the angular relation between the body and end portions of the fulcrum members, after the first step of the operation. The following figures show the dies for forming the solid seat 15 on the fulcrum. Fig. 5 is a transverse sectional view on the line 5—5 Fig. 9 through the male and female dies and looking toward the left; Fig. 6 is a transverse section on the line 6—6 looking toward the right and with the stock removed; Fig. 7 is a longitudinal sectional view of the dies with stock in position, the male die being shown in the act of just coming into contact with the stock; Fig. 8 is a view similar to Fig. 7 showing slight progressive movement of the male die; the stock being forced back by the male die in beginning to fill the cavity in the female die. Fig. 9 is a view similar to Fig. 7 showing a still further progressive movement of the male die, according to which the stock is shoved back, and fills all but the outer corners of the cavity. Fig. 10 is a view similar to Fig. 7 showing the male die in the final position at the end of the forward movement, according to which a set has been formed and the stock has filled the cavity completely and there being slightly more stock than is necessary to fill the cavity, a perfect weld has been made by means of the pressure exerted on the male die.

The reference numerals 1 and 2 designate arms or members constituting the fulcrum and 3 designates the tension member of a brake beam.

The fulcrum members 1 and 2 are in the illustrative instance made from two pieces of flat stock which are preferably first twisted and then bent and punched as shown in Figs. 1, 2, 3 and 4, excepting that the head providing the seat 14 has not yet been formed, this end at this time having the shape illustrated in Fig. 7, with the two ends 11 and 12 brought close together and parallel. After the two pieces 1 and 2 are twisted, bent and punched, they are suitably held together at their inner ends as by means of a bolt 4 and are spaced apart by means of the spacing block 5 through which the bolt 4 passes thus insuring the correct axial, as well as transverse positioning of the two pieces relatively to each other, and also facilitating the placing of the clamped-together pieces in the dies in which they are to be operated upon. After the members are thus secured together they are placed in a furnace and the ends 11, 12 heated to a welding heat after which the body or central portions are placed in the slots 6 and 6ª of a stationary female die 7. The machine is then put in operation and the moving female die 8 closes on the stationary female die 7, grips the stock, whereby the two female dies grip the body portion of the stock firmly on all sides.

The male die 9 provided with a longitudinally projecting nose 10 then travels forward by a suitable mechanism and forces the ends 11 and 12 of the stock backward, whereby the ends of the stock begin to fill the rear end of the cavity 13 as shown in Fig. 8. The male die continuing to move forwardly forces the ends of the stock apart forming a seat as shown in Fig. 9, in which figure the stock is shown as shoved back and the cavity 13 filled all but the outward corners. Further continued forward movement of the male die forces the metal of the ends of the stock to completely fill the cavity 13 as shown in Fig. 10, in which figure the male die is shown in its final position at the end of its forward movement. The stock has completely filled the cavity and the seat 14 has been finished, and there being slightly more stock than necessary to fill the cavity 13, a perfect weld has been made between the ends of the stock by means of the pressure exerted by the male die. By this method I form on the lower ends of the fulcrum members 1 and 2, a tension member seat 14 which extends transversely of the fulcrum member, the walls 15 of the seat being integral with the seat and with the members 1 and 2.

The previous twisting of the ends 11, 12, relatively to the arms 1, 2, (see Fig. 3) followed by the forging and solidifying of the ends, has the further advantage that the finished head with the seat 14 is placed diagonally over the arms or members 1 and 2, or in other words, that, for instance, the end 11 forming one side of the head, and being a part of member 1, has now been twisted and firmly joined, not only to the end 12, but also to the member 2, the grain of end 11, after the welding, running into the latter member. Thus any pressure transmitted through the side 11 of the head is transmitted to and sustained by both arms or members 1 and 2. The advantage of this is obvious over brake fulcrums in which the slot has been bridged over, and in which the pressure is taken up over the space between the members, whereas in the present case, such pressure is taken up directly over the two fulcrum members.

By welding the outer ends of the fulcrum members as described and shown I overcome all tendency of the tension member to split the fulcrum.

I claim:—

1. The improvement in the art of forming seats upon the ends of the slotted struts of trussed brake beams; which consists in providing a fulcrum blank having spaced longitudinal arms, confining said blank in dies having an opening to receive the end of the blank to be operated upon, upsetting the end of said blank while at a welding heat, and forming the same into a solid block, bridging the space between said arms, whereby thrust will be transmitted in the longitudinal direction of the arms only.

2. The improvement in the art of producing slotted fulcrums for trussed brake-beams, which consists in preparing a fulcrum-blank having arms spaced for providing a lever slot between them, and then, while at a welding heat, confining an end of said blank, embodying portions of said arms, in a mold having a cavity corresponding to the external lines of the bearing head to be formed and subjecting the confined portion of the blank to the action of a pressing die constructed to form a seat, and thereby welding the confined portions of the arms into a solid block integral with and longitudinally superimposed upon the two arms and bridging the slot between them.

3. The improvement in the art of producing slotted fulcrums for trussed brake-beams, which consists in preparing a fulcrum-blank having arms spaced for providing a lever-slot between them, and then, while at a welding heat, confining an end of said blank embodying portions of said arms, in a mold having a cavity of substantially rectangular section, and subjecting the confined portions of the blank to the action of a pressing die having a seat-forming projection positioned to extend diagonally from one arm to the other, and thereby welding the confined portions of the arms into a solid block integral with and longitudinally superimposed upon the two arms and bridging the slot between them.

4. The improvement in the art of producing slotted fulcrums for trussed brake-beams and with truss-member bearing heads, which consists in providing a fulcrum blank with substantially rectangular parallel arms having between them a space to form a fulcrum slot, introducing an end of said blank embodying portions of said arms, into a mold having confining walls conforming substantially to the section of the head to be formed, and while said portion of the blank is at welding heat, subjecting said end of the blank to pressure which welds together portions of the arms extending inwardly from the end of the blank and leaves an integral bearing head, in position to bridge the fulcrum slot and lie longitudinally superimposed upon the spaced arms of the blank.

5. The improvement in the art of producing forged fulcrums for trussed brake-beams and having truss-member bearing heads which consists in providing a blank having parallel arms of substantially rectangular section spaced apart to provide a fulcrum slot between them, and having the end of the blank torsionally deflected to displace the metal of each arm across the slot into position in line with the other arm, then while said deflected end of the blank is at welding heat, introducing it into a mold conforming to the external form of the head to be produced, and subjecting it to longitudinal pressure under a die having a seat-forming projection and until the end of the blank is reduced to a solid block bridging the slot between the arms, and integral with and longitudinally superimposed upon the said arms.

The foregoing specification signed at Cleveland, Ohio, this 9th day of July, 1915.

FREDERICK J. SCHROEDER.

In presence of—
C. E. MEYER,
C. R. WAGNER.